(12) United States Patent
Shimizu et al.

(10) Patent No.: US 8,602,546 B2
(45) Date of Patent: Dec. 10, 2013

(54) INK, INK CARTRIDGE, AND INK JET RECORDING METHOD

(75) Inventors: Yuhei Shimizu, Kawasaki (JP); Eiichi Nakata, Kawasaki (JP); Hideki Takayama, Fujisawa (JP); Yoshio Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 13/216,896

(22) Filed: Aug. 24, 2011

(65) Prior Publication Data

US 2012/0050386 A1 Mar. 1, 2012

(30) Foreign Application Priority Data

Aug. 31, 2010 (JP) ................................. 2010-194535

(51) Int. Cl.
*C09D 11/00* (2006.01)

(52) U.S. Cl.
USPC ........................................ 347/100; 106/31.13

(58) Field of Classification Search
USPC ........................................ 347/100; 106/31.13
See application file for complete search history.

(56) References Cited

U.S. PATENT DOCUMENTS

| | | | |
|---|---|---|---|
| 5,786,420 A * | 7/1998 | Grandhee | .......................... 525/7 |
| 6,074,052 A | 6/2000 | Inui et al. | |
| 6,698,876 B2 | 3/2004 | Sato et al. | |
| 6,848,781 B2 | 2/2005 | Ogino et al. | |
| 6,858,301 B2 | 2/2005 | Ganapathiappan | |
| 6,874,881 B2 | 4/2005 | Suzuki et al. | |
| 7,029,109 B2 | 4/2006 | Shirota et al. | |
| 7,055,943 B2 | 6/2006 | Suzuki et al. | |
| 7,144,452 B2 | 12/2006 | Takayama et al. | |
| 7,198,664 B2 | 4/2007 | Mafune et al. | |
| 7,198,665 B2 | 4/2007 | Nakamura et al. | |
| 7,247,196 B2 | 7/2007 | Sato et al. | |
| 7,291,211 B2 | 11/2007 | Kaneko et al. | |
| 7,291,214 B2 | 11/2007 | Tsuji et al. | |
| 7,291,361 B2 | 11/2007 | Ogino et al. | |
| 7,297,202 B2 | 11/2007 | Ichinose et al. | |
| 7,381,257 B2 | 6/2008 | Takayama et al. | |
| 7,402,200 B2 | 7/2008 | Imai et al. | |
| 7,513,944 B2 | 4/2009 | Sano et al. | |
| 7,578,876 B2 | 8/2009 | Nakajima et al. | |
| 7,615,113 B2 | 11/2009 | Aikawa et al. | |
| 7,854,798 B2 | 12/2010 | Udagawa et al. | |
| 7,868,060 B2 | 1/2011 | Sakai et al. | |
| 7,909,449 B2 | 3/2011 | Sato et al. | |
| 7,988,777 B2 | 8/2011 | Tanoue et al. | |
| 2004/0123773 A1 * | 7/2004 | Butler et al. | ................ 106/31.28 |
| 2004/0127601 A1 | 7/2004 | Sano et al. | |
| 2004/0131855 A1 | 7/2004 | Ganapathiappan | |
| 2004/0244622 A1 | 12/2004 | Ichinose et al. | |
| 2005/0043434 A1 | 2/2005 | Ichinose et al. | |
| 2008/0022887 A1 | 1/2008 | Tanoue et al. | |
| 2009/0226682 A1 | 9/2009 | Yatake | |
| 2009/0258145 A1 | 10/2009 | Mukae et al. | |
| 2009/0274839 A1 | 11/2009 | Nakata et al. | |
| 2011/0001775 A1 | 1/2011 | Nishiwaki et al. | |
| 2011/0281988 A1 | 11/2011 | Tanoue et al. | |

FOREIGN PATENT DOCUMENTS

| | | |
|---|---|---|
| EP | 1 849 840 A1 | 10/2007 |
| EP | 2 270 109 A1 | 1/2011 |
| JP | 2000-072991 A | 3/2000 |
| JP | 2004-211089 A | 7/2004 |
| JP | 2004-225037 A | 8/2004 |
| JP | 2004-331946 A | 11/2004 |

OTHER PUBLICATIONS

Dec. 6, 2011 European Search Report in European Patent Appln. No. 11006984.6.

* cited by examiner

*Primary Examiner* — Laura Martin
(74) *Attorney, Agent, or Firm* — Fitzpatrick, Cella, Harper & Scinto

(57) ABSTRACT

Provided are an ink with which an image excellent in both black density and glossiness can be recorded, and an ink cartridge and an ink jet recording method each using the ink. The ink includes: a carbon black; a resin for dispersing the carbon black; a resin fine particle; and a water-soluble organic solvent, in which: the resin fine particle contains at least a unit derived from an ethylenically unsaturated hydrophobic monomer, and a unit derived from a monomer selected from an ethylenically unsaturated acid monomer and a salt thereof, and a ratio of a unit derived from a saturated alkyl group-containing monomer to the unit derived from the ethylenically unsaturated hydrophobic monomer is 95.0 mass % or more; and the water-soluble organic solvent contains a water-soluble organic solvent having a dielectric constant at 20° C. of 18.0 or more and less than 30.0.

15 Claims, No Drawings

INK, INK CARTRIDGE, AND INK JET RECORDING METHOD

BACKGROUND OF THE INVENTION

1. Field of the Invention

The present invention relates to an ink suitable for ink jet recording, and an ink cartridge and an ink jet recording method each using the ink.

2. Description of the Related Art

In recent years, the advance of an ink jet recording technology has started to enable easy, low-cost recording of such high-definition images each having high glossiness as realized in a silver halide photography and offset printing even in ordinary households. The term "glossiness" as used herein refers to the following state of the reflected light of illumination or the like, which is reflected in an image recorded on any one of the recording media each having a glossy surface (so-called glossy papers), on the image. In the image, "glare" due to the reflected light is suppressed and the reflected light is vividly observed.

When a dye ink containing a dye as a coloring material is used for realizing high glossiness, a good image free of graininess is obtained. On the other hand, the following problem arises. The image is poor in fastness properties. In view of the foregoing, an ink containing a pigment as a coloring material has started to be used in recent years. An ink obtained by dispersing the pigment with a water-soluble resin has started to be widely used as such ink for the purposes of additionally improving, for example, the fixability of the pigment to a recording medium and the abrasion resistance of an image.

However, the following problem arises. The color developability of an image recorded with the pigment ink is generally insufficient as compared with that in the case of the dye ink. In addition, the following problem arises owing to the fact that the pigment is a particle. The glossiness of an image recorded on a recording medium having gloss on its surface is particularly insufficient as compared with that in the case of the dye ink. Those problems remarkably occur particularly when glossy paper is used. Accordingly, improvements in the color developability and glossiness of an image such as a photograph recorded with the pigment ink have been strongly requested in recording the image.

Particularly in the case of a monochromatic image recorded with the pigment ink, the internal scattering of light occurs owing to voids in a pigment layer, and light thus generated is observed as the reflected light of the image. As a result, an apparent black density remarkably reduces as compared with that of a monochromatic image recorded with the dye ink. In addition, carbon black having a relatively high refractive index among pigments is used in a black type ink. Accordingly, an image recorded with the ink is apt to glare and its glossiness is insufficient.

Various attempts have heretofore been made to solve such problem as described above, i.e., an improvement in the performance of the monochromatic image recorded with the pigment ink. For example, a proposal concerning the following has been made (see Japanese Patent Application Laid-Open No. 2004-225037). In order that the glare of an image recorded with a pale black ink may be suppressed, the content of a resin emulsion in the ink is made twice or more as large as the content of carbon black. In addition, a proposal concerning the following has been made (see Japanese Patent Application Laid-Open No. 2000-072991). Resin fine particles each having a multilayer structure or microdomain structure formed of two or more kinds of resins having different refractive indices are incorporated into an ink for improving color developability. Further, a proposal concerning the following has been made (see Japanese Patent Application Laid-Open No. 2004-331946). Carbon black to which resin fine particles are stuck and the resin fine particles are incorporated into an ink for improving color developability and glossiness.

SUMMARY OF THE INVENTION

However, investigations conducted by the inventors of the present invention have found that such prior art as listed above is insufficient in terms of a black density and glossiness as problems taken particularly seriously in an image recorded on glossy paper with an ink containing carbon black. First, in the invention described in Japanese Patent Application Laid-Open No. 2004-225037, the ink contains the resin emulsion having the lower refractive index at a content twice or more as large as that of the carbon black having the higher refractive index, and hence the glare of the image is suppressed and its glossiness is improved. However, it is hard to say that the image is sufficient in terms of color developability because a reduction in its black density is observed owing to the reflection of white light from the image. In addition, in the invention described in Japanese Patent Application Laid-Open No. 2000-072991, resin fine particles each having an aromatic unit having a relatively high refractive index among monomer units to be typically used are used in order that a refractive index difference may be caused in each of the resin fine particles. Accordingly, the refractive index of an image cannot be reduced. In addition, the glare of the image is insufficiently suppressed, and hence its glossiness has not become a sufficiently satisfactory one. Further, the invention described in Japanese Patent Application Laid-Open No. 2004-331946 is also insufficient in terms of glossiness because the surface of the recorded image does not have smoothness.

Therefore, an object of the present invention is to provide an ink suitable for ink jet recording with which a monochromatic image excellent in both black density and glossiness can be recorded, and an ink cartridge and an ink jet recording method each using the ink.

The above-mentioned object is achieved by the present invention described below. That is, an ink according to the present invention includes, a carbon black, a resin for dispersing the carbon black, a resin fine particle, and a water-soluble organic solvent, in which the resin fine particle contains at least a unit derived from an ethylenically unsaturated hydrophobic monomer, and a unit derived from a monomer selected from an ethylenically unsaturated acid monomer and a salt thereof, and a ratio of a unit derived from a saturated alkyl group-containing monomer to the unit derived from the ethylenically unsaturated hydrophobic monomer is 95.0 mass % or more, and the water-soluble organic solvent contains a water-soluble organic solvent having a dielectric constant at 20° C. of 18.0 or more and less than 30.0.

According to the present invention, there can be provided an ink with which a monochromatic image excellent in both black density and glossiness can be recorded, and an ink cartridge and an ink jet recording method each using the ink.

DESCRIPTION OF THE EMBODIMENTS

Hereinafter, the present invention is described in detail by taking a preferred embodiment of the present invention as an example. Hereinafter, carbon black is sometimes referred to as "pigment." It should be noted that the term "average particle diameter" as used in the present invention refers to an average particle diameter (D50) on a volume basis, which is the 50% cumulative value of a particle diameter distribution.

First, the inventors of the present invention have conducted investigations on an approach to improving the color developability of a monochromatic image recorded with an ink containing carbon black dispersed with a resin. The absorption of light in a pigment layer is important in improving the color developability of the monochromatic image, i.e., the black density of the image. The black density of the image increases as the quantity of the absorbed light increases. Here, in the image recorded with the ink containing the carbon black, the "surface scattering" of light is apt to occur upon incidence of the light on the surface of the image owing to the fact that the surface of the pigment layer formed of the carbon black is rough. In addition, voids in which air as well as the pigment is included are diffused in the pigment layer that forms the image, and the voids cause the "internal scattering" of the light. In view of the foregoing, the inventors have obtained the following finding. In the image recorded with the ink containing the carbon black, the "surface scattering" and "internal scattering" of light occur and any such scattered light is observed as the reflected light of the image, and as a result, the amount of absorbed light apparently reduces, which is responsible for a reduction in the black density of the image.

Meanwhile, the reduction of glare caused by the fact that the carbon black has a high refractive index is important in improving the glossiness of the monochromatic image recorded with the ink containing the carbon black. To this end, voids in which air is included are formed in the pigment layer on purpose, and the refractive index of the entire pigment layer is reduced by utilizing air having a low refractive index. Thus, the glossiness of the image is improved. As described above, however, the presence of the voids generates light resulting from the "internal scattering," and hence the black density of the image reduces.

The inventors of the present invention have obtained, from the above-mentioned finding, the following finding. It is sufficient to form an image having such a layer construction as described below with an ink into which carbon black and resin fine particle are incorporated. First, voids are caused to exist in a pigment layer on purpose so that the refractive index of the entire pigment layer may be reduced and the glossiness of the image may be improved. Further, a resin layer is formed of the resin fine particle on the pigment layer so that light resulting from the "internal scattering" may be caused to remain in the pigment layer and reflected light may be reduced. The inventors have assumed that the black density of the image can be increased with such layer construction.

The inventors of the present invention have conducted investigations from such viewpoint, and as a result, have found the following method for forming the resin layer on the pigment layer. That is, the inventors have concluded that causing the resin fine particle and the carbon black to undergo layer separation by the following procedure is effective for the formation. Upon application of the ink to a recording medium, a difference in sedimentation velocity is caused between the carbon black and the resin fine particle in an ink droplet or a dot formed of the droplet. Of course, part of the resin fine particles may be mixed into the pigment layer. However, causing the difference in sedimentation velocity suppresses the filling of the voids of the pigment layer with the resin fine particle to some extent, and hence the refractive index of the entire pigment layer reduces and the glossiness of the image is improved. In addition, the inventors have considered that to cause such difference in sedimentation velocity can be achieved by swelling the resin fine particle to increase their particle diameters in the process of applying the ink to the recording medium. Further, the inventors have considered that when the recessed portions of irregularities on the surface of the pigment layer are filled with the resin fine particle, the smoothening of the surface of the image is achieved, and the smoothening suppresses the "surface scattering" of light, increases the black density of the image, and additionally improves the glossiness of the image. In addition, the inventors have considered that such smoothening of the surface of the image with the resin fine particle can be achieved by imparting flexibility to the resin fine particle in the process of applying and fixing the ink to the recording medium.

When the particle diameter of the resin fine particle is increased by swelling the resin fine particle in the process of applying the ink to the recording medium, the difference in sedimentation velocity with the carbon black becomes extremely large. In this case, after the application of the ink to the recording medium, the resin layer formed of the resin fine particle is formed on the pigment layer formed of the carbon black. As a result, light generated by the "internal scattering" due to the voids in the pigment layer is reflected by the resin layer toward the pigment layer and hence not observed as the reflected light of the image. It can be assumed that the black density of the image thus increases. Further, an intermolecular force acting between molecules that form the resin fine particle is a weak force, and hence the flexibility is maintained for a while even after the application of the ink to the recording medium. Accordingly, it can be assumed that when the recessed portions of the irregularities on the surface of the pigment layer are filled with the resin fine particle, the surface of the image is smoothened so that the "surface scattering" of light may hardly occur and the black density may increase. As described above, the following procedure is important in improving the black density of the image. Image layers are formed as described above and caused to absorb light in the entire wavelength region.

The reason why no increase in black density was observed in the image recorded with the ink described in Japanese Patent Application Laid-Open No. 2004-225037 may be the absence of any water-soluble organic solvent that swells the resin fine particle in the ink. A layer into which the pigment, the resin fine particle, and the voids were mixed was formed owing to the absence, and hence light generated by the "internal scattering" due to the voids was observed as the reflected light of the image. It can be assumed that the black density of the image thus reduced.

The reason why the glossiness of the image was improved in the present invention may be that a reduction in the refractive index of the entire pigment layer was achieved by causing the voids in which air was included to exist in the pigment layer. In other words, the reason may be that a reduction in the refractive index of the entire pigment layer was achieved by the establishment of such a state that the carbon black having a high refractive index, the resin fine particle having a refractive index lower than that of the carbon black, and air having a refractive index lower than that of the resin fine particle were present in the pigment layer. Further, as described above, the smoothness of the surface of the image was improved by the resin layer formed of the resin fine particle, and as a result, reflected light from the image may have been vividly observed and excellent glossiness free of glare may have been obtained.

The inventors of the present invention have conducted investigations by paying attention to the dielectric constant of a water-soluble organic solvent that forms the ink and the resin fine particle as specific requirements for achieving the above-mentioned image formation. In addition, the inventors have decided to use a water-soluble organic solvent having a dielectric constant of 18.0 or more and less than 30.0 as the water-soluble organic solvent. In addition, the inventors have decided to use a resin fine particle having a unit derived from a saturated alkyl group-containing, ethylenically unsaturated hydrophobic monomer having a small intermolecular force and a unit derived from a monomer selected from an ethylenically unsaturated acid monomer and a salt thereof as its constituent units as the resin fine particle for imparting swelling properties and flexibility to the resin fine particle.

First, when the dielectric constant of a water-soluble organic solvent to be added to an ink was low or high, the black density of an image was insufficient. Specifically, no increase in the black density of the image was observed when a water-soluble organic solvent having a dielectric constant of less than 18.0 or of 30.0 or more was added to the ink. In contrast, in an ink using a water-soluble organic solvent having a dielectric constant of 18.0 or more and less than 30.0, an increase in the black density of an image was observed, and further, a slight improvement in its glossiness was observed. In addition, even when a water-soluble organic solvent having a dielectric constant in the above-mentioned range was used, the black density of an image did not increase in the case where a ratio of a unit derived from a saturated alkyl group-containing monomer to the unit derived from the ethylenically unsaturated hydrophobic monomer that formed the resin fine particle was less than 95.0 mass %.

The inventors of the present invention have considered the mechanism via which both the black density and glossiness of the image were improved by the above-mentioned construction to be as described below. First, the specific gravity of the carbon black is sufficiently high as compared with that of the resin fine particle. Accordingly, the pigment and the resin fine particle in the ink in a droplet state are each localized to some extent, and the resin fine particle is present in the upper layer of the droplet relative to the pigment. Next, when the ink adheres to a recording medium, the evaporation of moisture and the like occurs, and hence the water-soluble organic solvent is concentrated. As a result, the water-soluble organic solvent having a dielectric constant in the above-mentioned range permeates into the resin fine particle, and hence the resin fine particle swells and its particle diameter increases.

On the other hand, a water-soluble organic solvent having a dielectric constant of less than 18.0 has high permeability, but an action of its diffusion in the recording medium becomes dominant rather than an action of its permeation into the resin fine particle, and hence the resin layer to be formed on the pigment layer becomes thin. In addition, some of the water-soluble organic solvents having a dielectric constant of less than 18.0 have a low solubility for water in the ink. Accordingly, when the content of the solvent is such that the resin fine particle can be swollen, for example, sticking resistance in a recording head according to an ink jet system may not be obtained. In addition, a water-soluble organic solvent having a dielectric constant of 30.0 or more has a high polarizability, and is hence apt to cause electrostatic repulsion with an anionic group of the resin fine particle. Accordingly, the permeation of the solvent into the resin fine particle and the swelling of the resin fine particle become insufficient, and hence the resin layer to be formed on the pigment layer becomes thin. In other words, the resin layer to be formed when the dielectric constant of the water-soluble organic solvent is less than 18.0 or is 30.0 or more cannot reflect light generated by internal scattering toward the pigment layer, and hence the black density becomes insufficient. In addition, such resin layer does not make the surface of the image smooth, and hence the glossiness is not improved to a very large extent.

The inventors of the present invention have considered the reason why a high effect was obtained when the resin fine particle to be used in the present invention was such that the ratio of the unit derived from the saturated alkyl group-containing monomer to the unit derived from the ethylenically unsaturated hydrophobic monomer was 95.0 mass % or more to be as described below. That is, different from other ethylenically unsaturated hydrophobic monomers, a saturated alkyl group has no polarity, and hence only an extremely weak van der Waals force is exerted between the molecules that form the resin fine particle. Accordingly, it can be assumed that swelling with the water-soluble organic solvent having a dielectric constant in the above-mentioned range was not inhibited, and hence the resin fine particle swelled and its particle diameter significantly increased. On the other hand, when the above-mentioned ratio is less than 95.0 mass %, the polarity of the unit derived from the ethylenically unsaturated hydrophobic monomer is high, and hence the water-soluble organic solvent having a dielectric constant in the above-mentioned range hardly permeates into a gap between the molecules that form the resin fine particle and the swelling is inhibited. In this case, the resin layer to be formed on the pigment layer becomes thin. In addition, the flexibility of the resin fine particle is insufficient, and hence the surface of the resin layer does not become smooth, the black density becomes insufficient, and the glossiness also reduces.

In view of the results of the above-mentioned investigations, the reason why an image excellent in black density and glossiness is obtained with the ink of the present invention is summarized as described below. The application of the ink of the present invention to a recording medium results in the formation of the resin layer of the resin fine particle on the pigment layer of the carbon black. Further, the recessed portions of the irregularities on the surface of the pigment layer are filled with the resin fine particle so that the surface of the image may be smoothened. Accordingly, the "surface scattering" of light caused by the rough surface of the pigment layer and the "internal scattering" of the light resulting from the voids in the pigment layer are reduced, and hence the black density of the image can be increased. Further, the recessed portions on the surface of the pigment layer are filled with the resin fine particles so that the surface of the image may be smoothened. In addition, to cause the voids to exist in the pigment layer can reduce the refractive index of the entire pigment layer. It can be assumed that high glossiness is thus obtained.

<Ink>

Hereinafter, each component that forms the ink of the present invention that is suitable for ink jet recording is described.

(Carbon Black and Resin for Dispersing Carbon Black)

A coloring material to be used in the ink of the present invention is carbon black, which is dispersed in an ink, and more specifically, in an aqueous medium by use of a resin. Any of conventionally known carbon blacks such as furnace black, acetylene black, lamp black, and gas black may be used as the carbon black, and a plurality of kinds of such carbon blacks may be used in combination. The content (mass %) of the carbon black in the ink is preferably 1.0 mass % or more and 10.0 mass % or less based on the total mass of the ink. Further, the average particle diameter of the carbon black is preferably 50 nm or more and 150 nm or less, more preferably 80 nm or more and 130 nm or less.

A water-soluble resin capable of stably dispersing the carbon black in the aqueous medium that forms the ink by an action of an anionic group is suitably used as the resin to be used for dispersing the carbon black, i.e., a resin dispersant. It should be noted that a state in which a resin is water-soluble in the present invention means that when the resin is neutralized with an alkali whose amount is equivalent to its acid value, the resin has no particle diameter. A resin that satisfies such condition is described as a water-soluble resin in the specification. The content (mass %) of the resin dispersant in the ink is preferably 0.1 mass % or more and 10.0 mass % or less based on the total mass of the ink.

The resin to be used as a dispersant preferably has at least such a hydrophilic unit and a hydrophobic unit as listed below as constituent units. It should be noted that the term "(meth) acryl" as used herein refers to "acryl" and "methacryl."

Examples of the monomer serving as the hydrophilic unit after the polymerization include acid monomers including carboxy group-containing monomers such as (meth)acrylic acid, itaconic acid, maleic acid, and fumaric acid, sulfonic acid group-containing monomers such as styrenesulfonic acid, phosphonic acid group-containing monomers such as (meth)acrylic acid-2-phosphonic acid ethyl ester, anhydrides and salts of those acid monomers, and other anionic monomers. It should be noted that constituent cations of the salts of the acid monomers are, for example, lithium, sodium, potassium, ammonium, and organic ammonium ions.

Further, examples of the monomer serving as the hydrophobic unit after the polymerization include aromatic ring-containing monomers such as styrene, α-methylstyrene, vinylnaphthalene, and benzyl (meth)acrylate, and (meth) acrylic esters of aliphatic alcohols, such as ethyl (meth)acrylate, methyl (meth)acrylate, (iso)propyl (meth)acrylate, (n-, iso-, or t-)butyl (meth)acrylate, and 2-ethylhexyl (meth)acrylate.

In the present invention, an acrylic, water-soluble resin having at least an acrylic component such as a hydrophilic unit derived from (meth)acrylic acid or a unit derived from a (meth)acrylic ester of an aliphatic alcohol is preferably used. Further, a copolymer having at least a hydrophilic unit derived from (meth)acrylic acid and a hydrophobic unit derived from an aromatic ring-containing monomer such as styrene, α-methyl styrene, or benzyl (meth)acrylate is particularly suitably used.

The resin to be used as a dispersant in the present invention preferably has a weight average molecular weight of 1,000 or more and 15,000 or less. In addition, the resin to be used as a dispersant preferably has an acid value of 90 mgKOH/g or more and 200 mgKOH/g or less.

The ink of the present invention contains a resin for dispersing the carbon black in an ink, more specifically an aqueous medium containing a water-soluble organic solvent. The manner in which the carbon black is dispersed is not limited to such that the carbon black is dispersed by causing the resin dispersant to physically adsorb to the surface of a particle of the carbon black, and may be such that the pigment is dispersed by using the resin. That is, a microcapsule pigment, resin-bonding type pigment, or the like as well as the above-mentioned resin-dispersible pigment using a resin as a dispersant can be used. The term "microcapsule pigment" as used herein refers to a pigment to be dispersed by being turned into a microcapsule through the coating of the pigment with a resin or a polymer, and the term "resin-bonding type pigment" as used herein refers to such a pigment that an organic group containing a polymer is chemically bonded to the surface of a pigment particle. Of course, the carbon blacks listed above that are to be dispersed by different methods with resins can be used in combination. It should be noted that resin fine particle to be described later does not need to contribute to the dispersion of the carbon black, and no resin fine particle preferably adsorbs to the surfaces of the particles of the carbon black.

In the present invention, a mass ratio of the content (mass %) of the resin for dispersing the carbon black in the ink to the content (mass %) of the carbon black is preferably 0.15 time or more and 0.30 time or less. That is, a ratio "content of the resin/content of the carbon black" is preferably 0.15 time or more and 0.30 time or less. It should be noted that a content when the mass ratio is calculated is the content of each component based on the total mass of the ink. When the mass ratio is less than 0.15 time, the resin does not sufficiently adsorb to the surface of the particle of the carbon black, which threatens to preclude sufficiently stable dispersion of the carbon black. In this case, abrupt agglomeration of the carbon black occurs upon application of the ink to a recording medium, and hence the irregularities of the pigment layer become particularly remarkable. As a result, the extent of the "surface scattering" of light in an image enlarges, and hence a high level of black density and glossiness of the image is not sufficiently obtained in some cases. On the other hand, when the mass ratio exceeds 0.30 time, the amount of the resin that adsorbs to the surface of the particle of the carbon black becomes sufficient or excessive, and hence the dispersed state of the carbon black becomes particularly stable. In this case, moderate agglomeration of the carbon black occurs upon application of the ink to the recording medium, and hence the carbon black starts to closely fix. In addition, the excessive resin fills a gap between the particles of the carbon black so that the number of voids in the pigment layer may reduce. Further, the surface properties of a carbon black particle to which a sufficient amount of the resin has adsorbed approach the nature of the resin. Accordingly, the carbon black and the resin fine particle to be incorporated into the ink are apt to exist in a mixed state after the application of the ink to the recording medium. As a result, the resin layer of the resin fine particle and the pigment layer are not separated from each other to a sufficient extent, and hence a high level of black density and glossiness of the image is not sufficiently obtained in some cases.

(Resin Fine Particle)

The resin fine particle is incorporated into the ink of the present invention. The resin fine particles exist in the so-called emulsion state in the ink. The resin fine particle to be used in the present invention contain at least a unit derived from a ethylenically unsaturated hydrophobic monomer, and a unit derived from a monomer selected from an ethylenically unsaturated acid monomer and a salt thereof. Further, a ratio (mass %) of a unit derived from a saturated alkyl group-containing monomer to the unit derived from the ethylenically unsaturated hydrophobic monomer is 95.0 mass % or more. In the present invention, the above-mentioned ratio is particularly preferably 100.0 mass %. In other words, all the units derived from the ethylenically unsaturated hydrophobic monomers that form the resin fine particle are particularly preferably the units derived from the saturated alkyl group-containing monomers. The resin fine particle may be of any form as long as the above-mentioned condition is satisfied. The form of the resin fine particle is, for example, such that the resin fine particle is formed of a resin of a single composition or such that the resin fine particle is formed of multiple layers of resins. The content (mass %) of the resin fine particle in the ink is preferably 0.3 mass % or more and 5.0 mass % or less based on the total mass of the ink.

In the present invention, resin fine particle having a core layer and a shell layer is preferably used. It is preferred that a unit that forms the core layer contains a unit derived from an ethylenically unsaturated hydrophobic monomer, and units that form the shell layer contain both a unit derived from an ethylenically unsaturated hydrophobic monomer and the unit derived from a monomer selected from the ethylenically unsaturated acid monomer and the salt thereof. A unit derived from a saturated alkyl group-containing monomer, which may be incorporated into only one of the core layer and the shell layer, is more preferably incorporated into each of both the core layer and the shell layer. Such resin fine particle has the following feature. Upon application of the ink to a recording medium, a water-soluble organic solvent having a dielectric constant in a specific range acts on the unit derived from the saturated alkyl group-containing monomer so that the solvent may easily permeate into the resin fine particle. As a result, the resin fine particle easily swells and their particle diameter increases. That is, as described in the foregoing, improvements in the black density and glossiness of an image require increases in the particle diameter of the resin fine particle upon application of the ink to the recording medium and the formation of the resin layer of the resin fine particle on the pigment layer. In addition, the increases in the particle diameter of the resin fine particle is caused by the permeation of the water-soluble organic solvent having a dielectric constant in the specific range into the resin fine particle to swell the resin fine particle.

In the case of the resin fine particle having the core layer and the shell layer, a ratio (mass %) of a unit derived from a saturated alkyl group-containing monomer to the unit derived from the ethylenically unsaturated hydrophobic monomer that form the core layer and the shell layer must be 95.0 mass % or more. A saturated alkyl group has no polarity, and hence only an extremely weak van der Waals force is exerted between the molecules that form the resin fine particle. Accordingly, the water-soluble organic solvent enters not only the surface of the resin fine particle but also the inside of the particle, and easily permeates up to the vicinity of the center of the particle. Accordingly, such resin fine particle that the unit derived from the saturated alkyl group-containing monomer is incorporated into both the core layer and the shell layer is suitable because the water-soluble organic solvent easily remains in the resin fine particle and hence the particle diameter of the resin fine particle particularly easily increase.

The saturated alkyl group-containing monomer as described above is a monomer in which a saturated alkyl group is bonded to an ethylenically unsaturated group via an ester bond, an ether bond, an amide bond, or the like. It is preferred that an alkyl group moiety of the monomer be free of a substituent. Examples of the saturated alkyl group-containing monomer include saturated alkyl group-containing monomers having a chain structure and a cyclic structure. Specific examples thereof include: saturated alkyl group-containing monomers each having a straight chain structure such as methyl (meth)acrylate, ethyl (meth)acrylate, propyl (meth)acrylate, butyl (meth)acrylate, hexyl (meth)acrylate, nonyl (meth)acrylate, dodecyl (meth)acrylate, tridecyl (meth)acrylate, tetradecyl (meth)acrylate, hexadecyl (meth)acrylate, stearyl (meth)acrylate, and ethyl vinyl ether; saturated alkyl group-containing monomers each having a branched chain structure such as isopropyl (meth)acrylate, isobutyl (meth)acrylate, t-butyl (meth)acrylate, and 2-ethylhexyl (meth)acrylate; and saturated alkyl group-containing monomers each having a cyclic structure such as cyclopropyl (meth)acrylate and cyclohexyl (meth)acrylate, provided that the term "(meth)acryl" as used herein refers to "acryl" and "methacryl."

In the present invention, a saturated alkyl group-containing monomer having a chain structure is particularly preferably used as the saturated alkyl group-containing monomer. A stronger van der Waals force is apt to act on a saturated alkyl group-containing monomer having a cyclic structure than on the saturated alkyl group-containing monomer having a chain structure. Accordingly, the resin fine particle using the saturated alkyl group-containing monomer having a cyclic structure is inferior in flexibility to resin fine particle using the saturated alkyl group-containing monomer having a chain structure. In addition, in the case where the saturated alkyl group-containing monomer is of a cyclic structure, the recessed portions of the pigment layer cannot be filled with the resin fine particle well in the process of forming the resin layer as compared with that in the case where the monomer is of a chain structure, and hence the smoothness of the surface of an image may not be sufficiently obtained. Accordingly, the degree of the surface scattering of light increases, and hence the black density may become relatively low and the glossiness may also become relatively low owing to a reduction in image clarity.

In the present invention, further, a (meth) acrylic ester of a saturated aliphatic primary alcohol having a chain structure among the saturated alkyl group-containing monomers having a chain structure is more preferably used. This is because of the following reasons. An acrylic ester or a methacrylic ester has high reactivity, and hence synthesized resin fine particle has high dispersion stability. Further, the swelling of the resin fine particle with the water-soluble organic solvent occurs with additional efficiency, and hence increase in the particle diameter of the resin fine particle becomes particularly significant. It should be noted that in the present invention, the constituent units of the resin fine particle is more preferably free of any unit having an amide structure because the resin fine particle may have difficulty in swelling with the water-soluble organic solvent.

The ethylenically unsaturated acid monomer to be used in the present invention has an acidic group such as a carboxy group, a sulfonic acid group, or a phosphoric acid group in its structure. Examples of the ethylenically unsaturated acid monomer which may be suitably used in the present invention include carboxy group-containing monomers such as (meth) acrylic acid, itaconic acid, maleic acid, and fumaric acid, sulfonic acid group-containing monomers such as styrenesulfonic acid, phosphonic acid group-containing monomers such as (meth)acrylic acid-2-phosphonic acid ethyl ester, anhydrides and salts of those acid monomers, and other anionic monomers. It should be noted that constituent cations of the salts of the acid monomers are, for example, lithium, sodium, potassium, ammonium, and organic ammonium ions.

The content (mass %) of the resin fine particle in the ink is preferably 0.30 mass % or more and 5.0 mass % or less based on the total mass of the ink. When the content is less than 0.30 mass %, the amount of the resin fine particle is small, and hence a resin layer having a sufficient thickness cannot be formed on the pigment layer. Accordingly, light resulting from the "internal scattering" is not sufficiently caused to remain in the pigment layer, and hence high levels of black density and glossiness of an image are not sufficiently obtained in some cases. On the other hand, when the content exceeds 5.0 mass %, the content of the solid matter in the ink increases. As a result, a dot to be formed on a recording medium upon application of the ink to the recording medium becomes high, and hence the smoothness of the surface of the image reduces in some cases. Accordingly, surface-scattered light is remarkably generated, and hence high levels of black density and glossiness of the image are not sufficiently obtained in some cases. The content (mass %) of the resin fine particle in the ink is more preferably 0.50 mass % or more and 2.0 mass % or less based on the total mass of the ink.

Although a method of synthesizing the resin fine particle to be used in the present invention is not particularly limited, the resin fine particle obtained by a soap-free polymerization method is preferably used. Further, the resin fine particle obtained by the soap-free polymerization method and having a core-shell structure is particularly preferably used. As described in the foregoing, the formation of the resin layer on the pigment layer is important in obtaining a high black density and high glossiness of the image. However, emulsion polymerization in which an emulsifier or a surfactant is used in combination at the time of synthesis involves the following risk. The emulsifier or the surfactant remains in a water dispersion liquid of the resin fine particle. When the remaining emulsifier or surfactant adsorbs to the carbon black so that an affinity between the carbon black and the resin fine particle may increase, the above-mentioned layer formation may be inhibited, and as a result, high levels of black density and glossiness of the image may not be obtained.

The resin fine particle to be used in the present invention has an average particle diameter of preferably 30 nm or more and 200 nm or less, more preferably 40 nm or more and 170 nm or less. In addition, the resin fine particle to be used in the present invention preferably has a minimum film forming temperature of 15° C. or less. Meanwhile, a lower limit for the minimum film forming temperature is preferably −50° C. or more. The minimum film forming temperature of the resin fine particle can be adjusted by changing, for example, the kind and composition ratio of a monomer to be used, and the weight average molecular weight of the resin fine particle. It should be noted that the minimum film forming temperature of the resin fine particle can be measured in conformity with the test method of ISO 2115.

(Water-Soluble Organic Solvent Having Dielectric Constant at 20° C. of 18.0 or More and Less than 30.0)

The inventors of the present invention have conducted investigations, and as a result, have found that the resin fine particle having the construction described in the foregoing easily swell with a water-soluble organic solvent having a dielectric constant in a specific range. That is, the particle diameter of the resin fine particle increases by about several percent to several tens of percent when the resin fine particle is caused to coexist with the water-soluble organic solvent having a dielectric constant in the specific range. It should be noted that the swelling properties of the resin fine particle can be confirmed on the basis of changes in their particle diameters before and after contact with the water-soluble organic solvent having a dielectric constant in the specific range.

It is essential for the ink of the present invention to contain a water-soluble organic solvent having a dielectric constant at 20° C. of 18.0 or more and less than 30.0. The content (mass %) of the above-mentioned water-soluble organic solvent in the ink is preferably 0.5 mass % or more and 10.0 mass % or less based on the total mass of the ink. It should be noted that as described heretofore, the resin fine particle swells with the water-soluble organic solvent having a specific dielectric constant and hence an effect of the present invention is obtained. Therefore, as long as the ink contains at least one kind of water-soluble organic solvent having a dielectric constant at 20° C. of 18.0 or more and less than 30.0, the ink may contain any other water-soluble organic solvent.

The water-soluble organic solvent having a dielectric constant at 20° C. of 18.0 or more and less than 30.0 is not particularly limited as long as the water-soluble organic solvent shows a dielectric constant in the range. In the present invention, specifically, for example, 1,2,6-hexanetriol (dielectric constant: 28.5), 2-pyrrolidone (dielectric constant: 27.5), 1,5-pentanediol (dielectric constant: 26.9), 3-methyl-1,5-pentanediol (dielectric constant: 23.9), or a polyethylene glycol having an average molecular weight of 200 (dielectric constant: 19.5) is particularly preferably used as the water-soluble organic solvent. It should be noted that in the present invention, the dielectric constant was measured with an LCR Meter 4284A (manufactured by Hewlett-Packard Japan, Ltd.) under the conditions of a temperature of 20° C. and a measuring frequency of 1 MHz.

In the present invention, the vapor pressure at 20° C. of the water-soluble organic solvent having a dielectric constant of 18.0 or more and less than 30.0 is preferably lower than that of water. The water-soluble organic solvent having such vapor pressure is suitable because of the following reason. Upon application of the ink to a recording medium, the concentration of the above-mentioned water-soluble organic solvent is relatively increased by the evaporation of water, and hence the resin fine particle can be swollen in a particularly efficient manner.

The content of the water-soluble organic solvent having a dielectric constant at 20° C. of 18.0 or more and less than 30.0 is preferably determined depending on a relationship with the content of the resin fine particle in the ink. In the present invention, a mass ratio of the content (mass %) of the resin fine particle to the content (mass %) of the water-soluble organic solvent having a dielectric constant at 20° C. of 18.0 or more and less than 30.0 is preferably 0.10 time or more and 1.0 time or less. That is, a ratio "content of the resin fine particle/content of the water-soluble organic solvent having a dielectric constant at 20° C. of 18.0 or more and less than 30.0" is preferably 0.10 or more and 1.0 or less. It should be noted that a content when the mass ratio is calculated is the content of each component based on the total mass of the ink. When the mass ratio is less than 0.10 time, the water-soluble organic solvent exists in an excessive amount with respect to the resin fine particle, and hence the resin fine particle not only swells but also conversely dissolves in the solvent in some cases. Accordingly, the thickness of the resin layer of the resin fine particle on the pigment layer is not sufficient. As a result, light resulting from the "internal scattering" cannot be caused to remain in the pigment layer, and hence a high level of black density is not sufficiently obtained in some cases. On the other hand, when the mass ratio exceeds 1.0 time, the resin fine particle cannot be sufficiently swollen, and hence a high level of black density is not sufficiently obtained in some cases. In the ink of the present invention, the mass ratio of the content (mass %) of the resin fine particle to the content (mass %) of the water-soluble organic solvent having a dielectric constant at 20° C. of 18.0 or more and less than 30.0 is more preferably 0.15 time or more and 0.35 time or less.

(Water-Soluble Urethane Resin)

A preferred mode of the ink of the present invention is, for example, such that a water-soluble urethane resin is further incorporated into the ink. It has been found that combined use of the water-soluble urethane resin in the ink according to the present invention can achieve an additionally high level of compatibility between the black density and glossiness of the image. It should be noted that a state in which a resin is water-soluble in the present invention means that when the resin is neutralized with an alkali whose amount is equivalent to its acid value, the resin has no particle diameter. A resin that satisfies such condition is described as a water-soluble resin in the specification.

The logic behind such conclusion is described below. As described in the foregoing, in the present invention, improvements in the black density and glossiness of the image are achieved by forming the ink so that the resin layer may be formed on the pigment layer while the voids are formed in the pigment layer. When the water-soluble urethane resin is incorporated into the ink, the agglomeration of the pigment is alleviated, and hence the voids of the pigment layer can be stably formed.

The water-soluble urethane resin to be used in the ink of the present invention is obtained by causing polyisocyanate and polyol to react with each other, and a chain-lengthening agent may be further caused to react with the polyisocyanate and the polyol. Alternatively, the resin may be, for example, a hybrid type resin obtained by bonding a urethane resin and any other resin. The content (mass %) of the water-soluble urethane resin in the ink is preferably 0.1 mass % or more and 5.0 mass % or less based on the total mass of the ink.

In addition, the inventors of the present invention have made further investigations, and as a result, have found that additionally high levels of black density and glossiness of the image are obtained by using a polyether-based urethane resin having a poly(oxytetramethylene) structure among the water-soluble urethane resins. The inventors of the present invention have considered the reason for the foregoing to be as described below. The poly(oxytetramethylene) structure interacts with the surface of a pigment particle to enable the urethane resin to exist near the pigment particle. Accordingly, the agglomeration of the pigment can be effectively alleviated in the process of fixing the ink to the recording medium, and as a result, the additionally high levels of black density and glossiness of the image are obtained.

When the ink of the present invention contains the urethane resin, a mass ratio of the content (mass %) of the urethane resin to the content (mass %) of the carbon black is preferably 0.15 time or more and 0.30 time or less. That is, a ratio "content of the urethane resin/content of the carbon black" is preferably 0.15 time or more and 0.30 time or less. It should be noted that a content when the mass ratio is calculated is the content of each component based on the total mass of the ink. When the mass ratio is less than 0.15 time, the amount of the urethane resin near the pigment is not sufficient, and hence the agglomeration of the pigment upon application of the ink to a recording medium cannot be sufficiently alleviated in some cases. As a result, the smoothness of the surface of an image reduces, and hence high levels of black density and glossiness of the image are not sufficiently obtained in some cases. On the other hand, when the mass ratio exceeds 0.30 time, the amount of the urethane resin present near the pigment becomes sufficient or excessive, and hence the dispersed state of the carbon black becomes particularly stable. In this case, moderate agglomeration of the carbon black occurs upon application of the ink to the recording medium, and hence the carbon black starts to closely fix. In addition, the excessive urethane resin fills a gap between the particles of the carbon black so that the number of voids in the pigment layer may reduce, and hence high levels of black density and glossiness of the image are not sufficiently obtained in some cases.

(Any Other Resin)

Another resin as well as the resin dispersant for the carbon black and the resin fine particle described above, and the above-mentioned water-soluble urethane resin and the like to be added as required can be added to the ink of the present invention. Such resin may be used as a dispersant for dispersing the carbon black and the resin fine particle in the aqueous medium in an additionally stable state, or may be added to the ink for any other purpose.

(Aqueous Medium)

An aqueous medium as a mixed solvent of water and the water-soluble organic solvent having a dielectric constant in a specific range described above is incorporated into the ink of the present invention. In the present invention, the ink is particularly preferably an aqueous ink containing at least water as an aqueous medium. The content (mass %) of the water-soluble organic solvent in the ink is preferably 3.0 mass % or more and 50.0 mass % or less based on the total mass of the ink. It should be noted that the content of the water-soluble organic solvent includes the content of the water-soluble organic solvent having a dielectric constant at 20° C. of 18.0 or more and less than 30.0. Any one of the solvents that can be used in ink jet inks such as alcohols, alkylene glycols, glycol ethers, and nitrogen-containing compounds can be used as a water-soluble organic solvent, and one or two or more kinds thereof can be incorporated into the ink. In addition, deionized water (ion-exchanged water) is preferably used as the water. The water content (mass %) in the ink is preferably 50.0 mass % or more and 95.0 mass % or less based on the total mass of the ink.

(Any Other Component)

The ink of the present invention may contain a water-soluble organic compound that is solid at normal temperature such as urea or a derivative thereof, trimethylolpropane, or trimethylolethane in addition to the above-mentioned components. The content (mass %) of the water-soluble organic compound is preferably 0.10 mass % or more and 20.0 mass % or less, more preferably 1.0 mass % or more and 15.0 mass % or less based on the total mass of the ink. Alternatively, the ink may contain any one of various additives such as a surfactant, a pH adjustor, a rust inhibitor, an antiseptic, a fungicide, an antioxidant, and an anti-reduction agent as required so as to have desired physical property values. It should be noted that the inventors of the present invention have confirmed that the water-soluble organic compounds that are solid at normal temperature and such various additives as listed in the foregoing each exert a considerably lower swelling action on the above-mentioned resin fine particle than that of a water-soluble organic solvent. Accordingly, in the present invention, there is no need to take the dielectric constants of the water-soluble organic compounds that are solid at normal temperature and of such various additives as listed in the foregoing into consideration.

<Ink Cartridge>

An ink cartridge of the present invention includes an ink and an ink storage portion for storing the ink, and the ink stored in the ink storage portion is the ink of the present invention described above. The structure of the ink cartridge is, for example, such that the ink storage portion is formed of a negative pressure-generating member-storing chamber for storing a negative pressure-generating member for holding the ink in a state of being impregnated with the ink by a negative pressure, and an ink storage portion for storing the ink in a state in which the negative pressure generating member is not impregnated with the ink. Alternatively, the ink storage portion may be of such a construction as to have no such ink storage chamber as described above and to hold the total amount of the ink in a state in which the negative pressure-generating member is impregnated with the ink, or may be of such a construction as to have no negative pressure-generating member and to store the total amount of the ink in a state in which the negative pressure generating member is not impregnated with the ink. Further, the ink cartridge may be of a shape formed so as to have the ink storage portion and a recording head.

<Ink Jet Recording Method>

An ink jet recording method of the present invention is a method involving ejecting the ink of the present invention described above from a recording head according to an ink jet system to record an image on a recording medium. A system for ejecting the ink is, for example, a system involving applying mechanical energy to the ink or a system involving applying thermal energy to the ink. In the present invention, an ink jet recording method involving utilizing thermal energy is particularly preferably adopted. Any step of the ink jet recording method other than the use of the ink of the present invention has only to be a known one. In addition, any medium may be used as the recording medium. Preferably used in the present invention is such a recording medium as described below. The pigment and the resin fine particle in the ink can be caused to exist on or near the surface of the recording medium. Such recording medium is, for example, a recording medium having an ink-receiving layer, which is suitable because the medium provides a significant effect particularly when used as a recording medium such as glossy paper having a glossy surface.

The ink of the present invention can be used as an ink set as well by being combined with any other ink. One or two or more kinds can be selected from, for example, cyan, magenta, yellow, black, red, green, and blue hues as the hues of the other inks. In addition, multiple inks each having the same hue as that of the above-mentioned ink and different from each other in pigment content may be used as inks that form the ink set. A combination of such multiple inks is, for example, a combination of inks having cyan hues such as dark cyan, middle cyan, and light cyan inks, or a combination of inks having magenta hues such as dark magenta, middle magenta, and light magenta inks. In addition, a clear ink free of any coloring material may be used as an ink that forms the ink set. Of course, the present invention is not limited to the inks with those hues, and the names of the inks such as dark, middle, and light are not limited thereto either.

Next, the present invention is described more specifically by way of examples and comparative examples. However, the present invention is not limited by the following examples and any modification can be made as long as the modification does not deviate from the gist of the present invention. It should be noted that the terms "part(s)" and "%" in the following description refer to "part(s) by mass" and "mass %," respectively unless otherwise stated.

<Preparation of Pigment Dispersion>
(Pigment Dispersions 1 to 6)

A mixture of carbon black (MA-100; manufactured by Mitsubishi Chemical Corporation), an aqueous solution of each resin (obtained by neutralizing a water-soluble resin with a 10.0% aqueous solution of sodium hydroxide, content of the resin (solid matter): 20.0%), and water of the composition (unit: part(s)) shown in the upper stage of Table 1 was prepared. A styrene-acrylic acid copolymer having an acid value of 170 mgKOH/g and a weight average molecular weight of 8,000 was used as a resin 1, and a benzyl methacrylate-acrylic acid copolymer having an acid value of 170 mgKOH/g and a weight average molecular weight of 8,000 was used as a resin 2. The mixture was loaded into a bead mill (LMZ 2; manufactured by Ashizawa Finetech Ltd.) filled with zirconia beads each having a diameter of 0.3 mm at a ratio of 80%, and was then dispersed at a number of revolutions of 1,800 rpm for 5 hours. After that, the resultant was centrifuged at a number of revolutions of 5,000 rpm for 30 minutes so that an agglomerated component was removed. Further, the remainder was diluted with ion-exchanged water. Thus, the respective pigment dispersions having properties shown in the lower stage of Table 1 were obtained.

TABLE 1

Compositions and properties of pigment dispersions

| | Kind of pigment dispersion | | | | | |
|---|---|---|---|---|---|---|
| | 1 | 2 | 3 | 4 | 5 | 6 |
| Carbon black | 20.0 | 20.0 | 20.0 | 20.0 | 20.0 | 20.0 |
| Aqueous solution of resin 1 | 20.0 | 12.0 | 15.0 | 30.0 | 40.0 | |
| Aqueous solution of resin 2 | | | | | | 20.0 |
| Water | 60.0 | 68.0 | 65.0 | 50.0 | 40.0 | 60.0 |
| Content of carbon black [%] | 15.0 | 15.0 | 15.0 | 15.0 | 15.0 | 15.0 |
| Content of resin [%] | 3.0 | 1.8 | 2.25 | 4.5 | 6.0 | 3.0 |
| Ratio of resin to carbon black | 0.20 | 0.12 | 0.15 | 0.30 | 0.40 | 0.20 |

(Pigment Dispersion 7)

Carbon black to which resin fine particles stuck was synthesized in accordance with Example 3 of Japanese Patent Application Laid-Open No. 2004-331946 listed in the foregoing. The carbon black was dispersed with a styrene-acrylic acid copolymer so that a pigment dispersion having a content of the carbon black of 10% was prepared. A mixture of monomers (5.7 parts of methyl methacrylate and 0.3 part of acrylic acid), 0.07 part of potassium hydroxide, 0.05 part of potassium persulfate, and 20 parts of water was added to 100 parts of the pigment dispersion, and then the whole was polymerized under a nitrogen atmosphere at 70° C. for 5 hours. After that, the resultant was diluted with water tenfold, and then the diluted solution was centrifuged in order that an agglomerated component might be removed. Further, in order that the styrene-acrylic acid copolymer might be removed, the remainder was centrifuged at 12,500 rpm for 2 hours, and then the sedimented product was fractionated. The sedimented product was diluted with ion-exchanged water. Thus, a pigment dispersion 7 having a content of the carbon black of 15.0% and a content of the resin fine particles of 7.5% was obtained. The carbon black in the pigment dispersion 7 was dispersed by the sticking of the resin fine particles formed of the methyl methacrylate-acrylic acid copolymer to the surfaces of the particles of the carbon black, and a ratio of the resin fine particles to the carbon black was 0.50.

<Synthesis of Resin Fine Particles>
(Resin Fine Particles P1 to P6 and P8 to P10)

Respective resin fine particles P1 to P6 and P8 to P10 having a core-shell structure were synthesized in accordance with the following procedure by a soap-free polymerization method. First, respective shell polymers S1 to S9 were synthesized. 100.0 Parts of ethylene glycol monobutyl ether were added to a four-necked flask provided with a stirring machine, a reflux condenser, and a nitrogen gas-introducing pipe. After that, a nitrogen gas was introduced into the reaction system, and then the temperature of the contents was increased to 110° C. under stirring. A mixture of the respective monomers of kinds and part(s) by mass shown in Table 2 below, and a solution obtained by dissolving 1.3 parts of t-butyl peroxide (polymerization initiator) in ethylene glycol monobutyl ether were dropped to the flask over 3 hours. After that, aging was performed for 2 hours, and further, ethylene glycol monobutyl ether was removed under reduced pressure. Thus, a solid resin was obtained. The polymer thus obtained was neutralized and dissolved by adding potassium hydroxide whose amount was equivalent to its acid value and an appropriate amount of ion-exchanged water at 80° C. Thus, an aqueous solution of the shell polymer the content of the shell polymer (solid matter) of which was 30.0% was obtained. Table 2 shows the values of the acid value and weight average molecular weight of the shell polymers S1 to S9 thus obtained.

TABLE 2

Main properties of shell polymers

| | | | \multicolumn{9}{c}{Kind of shell polymer} |
|---|---|---|---|---|---|---|---|---|---|---|---|
| | | | S1 | S2 | S3 | S4 | S5 | S6 | S7 | S8 | S9 |
| Monomer composition ratio (unit: part(s)) | Ethylenically unsaturated hydrophobic monomer | tBA | | | | | | 50.0 | | | |
| | | HA | | | | | | | | | |
| | | NA | | | | 33.0 | | | | | |
| | | 2EHA | 38.0 | 38.0 | | | | 38.0 | 38.0 | 38.0 | 38.0 |
| | | nLA | | | 12.0 | | | | | | |
| | | MMA | 34.0 | 34.0 | 35.0 | | | | 24.0 | 24.0 | 24.0 |
| | | EMA | | | | 35.0 | | | | | |
| | | nBMA | | | 25.0 | | | | | | |
| | | tBMA | | | | | 18.0 | | | | |
| | | CHMA | | | | | | 34.0 | | | |
| | | St | | | | | | | | 10.0 | |
| | | BzMA | | | | | | | | | 10.0 |
| | | EVE | | | | | | | 10.0 | | |
| | Ethylenically unsaturated acid monomer | AA | 28.0 | 28.0 | 28.0 | | | | 28.0 | 28.0 | 28.0 |
| | | MAA | | | | 32.0 | 32.0 | 28.0 | | | |
| Acid value of shell polymer [mgKOH/g] | | | 218 | 218 | 218 | 209 | 209 | 183 | 218 | 218 | 218 |
| Weight average molecular weight of shell polymer | | | 15,000 | 15,000 | 14,000 | 13,000 | 14,000 | 14,000 | 15,000 | 15,000 | 15,000 | tBA: t-Butyl acrylate,
HA: hexyl acrylate,
NA: nonyl acrylate,
2EHA: 2-ethylhexyl acrylate,
nLA: n-lauryl acrylate,
MMA: methyl methacrylate,
EMA: ethyl methacrylate,
nBMA: n-butyl methacrylate,
tBMA: t-butyl methacrylate,
CHMA: cyclohexyl methacrylate,
St: styrene,
BzMA: benzyl methacrylate,
EVE: vinyl ethyl ether,
AA: acrylic acid,
MAA: methacrylic acid Next, an aqueous solution of each shell polymer obtained in the foregoing was added to a four-necked flask provided with a stirring machine, a reflux condenser, and a nitrogen gas-introducing pipe so that the amount of the solid matter of the polymer was 60 parts. After that, a nitrogen gas was introduced into the reaction system, and then the temperature of the solution was increased to 80° C. under stirring. A mixture of the respective monomers of kinds shown in Table 3 below to serve as a core polymer was added to the flask so that its amount was 40 parts. After that, a liquid prepared by dissolving 1.0 part of potassium persulfate (polymerization initiator) in 16.7 parts of water was dropped to the flask over 3 hours. Then, aging was performed for 2 hours. After that, the amount of the solid matter was adjusted with an appropriate amount of ion-exchanged water. Thus, water dispersion liquids of the resin fine particles P1 to P6 and P8 to P10 the content of the resin fine particles (solid matter) of each of which was 25.0% were obtained.

TABLE 3

Main properties of core polymers

| | | | | \multicolumn{9}{c}{Kind of resin fine particles} |
|---|---|---|---|---|---|---|---|---|---|---|---|---|
| | | | | P1 | P2 | P3 | P4 | P5 | P6 | P8 | P9 | P10 |
| Shell polymer | | Kind | | S1 | S2 | S3 | S4 | S5 | S6 | S7 | S8 | S9 |
| | | Loading amount (solid matter: part(s)) | | 60 | 60 | 60 | 60 | 60 | 60 | 60 | 60 | 60 |
| Core polymer | Monomer composition ratio (unit: part(s)) | Ethylenically unsaturated hydrophobic monomer | tBA | | | | | 15.0 | | | | |
| | | | HA | | 20.0 | | | | | | | |
| | | | NA | | | 50.0 | | | | | | |
| | | | 2EHA | 20.0 | | | 20.0 | | 20.0 | 20.0 | 20.0 | 20.0 |
| | | | nLA | | | | 40.0 | 25.0 | | | | |
| | | | MMA | 80.0 | 70.0 | 50.0 | | | | 60.0 | 75.0 | 75.0 |
| | | | EMA | | | | 20.0 | | | | | |
| | | | nBMA | | | | 20.0 | | | | | |
| | | | tBMA | | | | | 60.0 | | | | |
| | | | CHMA | | | | | | 80.0 | | | |
| | | | St | | 10.0 | | | | | | 5.0 | |
| | | | BzMA | | | | | | | | | 5.0 |
| | | | EVE | | | | | | | 20.0 | | |

TABLE 3-continued

Main properties of core polymers

| | | Kind of resin fine particles | | | | | | | | |
|---|---|---|---|---|---|---|---|---|---|---|
| | | P1 | P2 | P3 | P4 | P5 | P6 | P8 | P9 | P10 |
| Ethylenically unsaturated acid monomer | AA MAA | | | | | | | | | |
| Loading amount (solid matter: part(s)) | | 40 | 40 | 40 | 40 | 40 | 40 | 40 | 40 | 40 |

Table 4 shows the properties of the resin fine particles P1 to P6 and P8 to P10 thus obtained. It should be noted that the term "core-to-shell ratio" in Table 4 refers to a mass ratio of a core polymer to a shell polymer. Each of the resultant resin fine particles had an average particle diameter of about 80 to 120 nm and a minimum film forming temperature of less than 5° C.

(Resin Fine Particles P11)

Resin fine particles P11 the core layer and shell layer of which had different refractive indices were synthesized in accordance with the following procedure. Specifically, the synthesis was performed in accordance with the method of producing the polymer fine particles 1 in Japanese Patent Application Laid-Open No. 2000-072991 listed in the fore-

TABLE 4

Properties of resin fine particles P1 to P6 and P8 to P10

| | | | Kind of resin fine particles | | | | | | | | |
|---|---|---|---|---|---|---|---|---|---|---|---|
| | | | P1 | P2 | P3 | P4 | P5 | P6 | P8 | P9 | P10 |
| Monomer composition ratio (unit: part(s)) | Ethylenically unsaturated hydrophobic monomer | tBA | | | | | | 6.0 | | | |
| | | HA | | | 8.0 | | 30.0 | | | | |
| | | NA | | | | 39.8 | | | | | |
| | | 2EHA | 30.8 | 30.8 | | | | | 30.8 | 30.8 | 30.8 |
| | | nLA | | | 23.2 | | 10.0 | | | | |
| | | MMA | 52.4 | 48.4 | 21.0 | 20.0 | | | 38.4 | 44.4 | 44.4 |
| | | EMA | | | 8.0 | 21.0 | | | | | |
| | | nBMA | | | 23.0 | | | | | | |
| | | tBMA | | | | | 34.8 | | | | |
| | | CHMA | | | | | | 52.4 | | | |
| | | St | | 4.0 | | | | | | 8.0 | |
| | | BzMA | | | | | | | | | 8.0 |
| | | EVE | | | | | | | 14.0 | | |
| | Ethylenically unsaturated acid monomer | AA | 16.8 | 16.8 | 16.8 | | | | 16.8 | 16.8 | 16.8 |
| | | MAA | | | | 19.2 | 19.2 | 16.8 | | | |
| Core-to-shell ratio | | | 0.67 | 0.67 | 0.67 | 0.67 | 0.67 | 0.67 | 0.67 | 0.67 | 0.67 |

(Resin Fine Particles P7)

Resin fine particles P7 were synthesized in accordance with the following procedure by an emulsion polymerization method involving using an emulsifier. Specifically, a core polymer was polymerized in the presence of a 30% aqueous solution of an emulsifier (Rhodafac RS 710; manufactured by Rhodia Novecare), and then a shell polymer was polymerized. A bifunctional monomer was used in the polymerization of the shell polymer, and the polymer was crosslinked by performing heating after the polymerization. The synthesis was specifically performed in accordance with the synthesis method in Example 2 of Japanese Patent Application Laid-Open No. 2004-211089, and then the amount of the solid matter was adjusted with an appropriate amount of ion-exchanged water. Thus, a water dispersion liquid of the resin fine particles P7 the content of the resin fine particles (solid matter) of which was 25.0% was obtained. The core polymer was of such a composition as to contain 17.5 parts of methyl methacrylate and 17.5 parts of hexyl acrylate. In addition, the shell polymer was of such a composition as to contain 29.2 parts of methyl methacrylate, 29.2 parts of hexyl acrylate, 0.6 part of ethylene glycol dimethacrylate, and 6.0 parts of monomethacryloyloxyethyl succinate. The resin fine particles P7 having a core-shell structure had a core-to-shell ratio of 0.54.

going, and then the amount of the solid matter was adjusted with an appropriate amount of ion-exchanged water. Thus, a water dispersion liquid of the resin fine particles P11 the content of the resin fine particles (solid matter) of which was 25.0% was obtained. The core polymer was of such a composition as to contain 50 parts of styrene, and the shell polymer was of such a composition as to contain 45 parts of dodecyl methacrylate and 5 parts of methacrylic acid. The resin fine particles P11 having a core-shell structure had a core-to-shell ratio of 1.00.

(Resin Fine Particles P12)

Monolayer resin fine particles P12 were synthesized in accordance with the following procedure. Specifically, the synthesis was performed in accordance with Preparation Example 1 of Japanese Patent Application Laid-Open No. 2004-225037 listed in the foregoing, and then the amount of the solid matter was adjusted with an appropriate amount of ion-exchanged water. Thus, a water dispersion liquid of the resin fine particles P12 the content of the resin fine particles (solid matter) of which was 25.0% was obtained. The resin fine particles P12 were of such a composition as to contain 60 parts of ethyl methacrylate, 36 parts of methyl methacrylate, and 4 parts of methacrylic acid.

(Resin Fine Particles P13)

Monolayer resin fine particles P13 were synthesized in accordance with the following procedure. Specifically, the synthesis was performed in accordance with Example 3 of Japanese Patent Application Laid-Open No. 2004-331946 listed in the foregoing, and then the amount of the solid matter was adjusted with an appropriate amount of ion-exchanged water. Thus, a water dispersion liquid of the resin fine particles P13 the content of the resin fine particles (solid matter) of which was 25.0% was obtained. The resin fine particles P13 were of such a composition as to contain 70 parts of styrene and 30 parts of acrylic acid.

<Synthesis of Water-Soluble Urethane Resin>
(Synthesis of Water-Soluble Urethane Resin U1 Having Polyoxytetramethylene Structure)

Synthesis was performed with a four-necked flask provided with a temperature gauge, a stirring machine, a nitrogen-introducing pipe, and a condenser. First, 480 g of a poly(oxytetramethylene) glycol having a number average molecular weight of 2,000 (average number of repetitions of oxytetramethylene units=27.5), 282 g of isophorone diisocyanate, and 0.007 g of dibutyltin dilaurate were loaded into the flask. After that, the contents were subjected to a reaction under a nitrogen gas atmosphere at 100° C. for 1 hour. After that, the resultant was cooled to 65° C. or less. 0.007 Gram of dimethylolpropionic acid, neopentyl glycol, and 447.8 g of methyl ethyl ketone were added to the resultant, and then the mixture was subjected to a reaction at 80° C. for 16 hours. After that, 408.1 g of methyl ethyl ketone and methanol were added to terminate the reaction. Thus, a polyether-based polyurethane resin U1 having a linear polyoxytetramethylene structure, the resin having an acid value of 55 mgKOH/g and a weight average molecular weight in terms of polystyrene of 33,000, was obtained. The urethane resin U1 contains the poly(oxytetramethylene) structure at 54%, and has a polyaddition reaction structure of neopentyl glycol and isophorone diisocyanate. Then, the solid content was adjusted with an appropriate amount of ion-exchanged water. Thus, an aqueous solution of the urethane resin U1 the content of the water-soluble urethane resin (solid matter) of which was 25.0% was obtained.

(Synthesis of Water-Soluble Urethane Resin U2 Having No Polyoxytetramethylene Structure)

Synthesis was performed in the same manner as in the method of synthesizing the urethane resin U1 except that 480 g of a polypropylene glycol having a number average molecular weight of 2,000 were used instead of the poly(oxytetramethylene) glycol. Thus, a linear polyether-based polyurethane resin U2 having an acid value of 55 mgKOH/g and a weight average molecular weight in terms of polystyrene of 29,000 was obtained. The urethane resin U2 contains the poly(oxypropylene) structure at 54%, and has a polyaddition reaction structure of neopentyl glycol and isophorone diisocyanate. Then, the solid content was adjusted with an appropriate amount of ion-exchanged water. Thus, an aqueous solution of the urethane resin U2 the content of the water-soluble urethane resin (solid matter) of which was 25.0% was obtained.

<Preparation of Ink>

The respective components (unit: %) shown in the upper stage of Table 5-1 to 5-3 were mixed and sufficiently stirred. After that, the mixture was filtered with a membrane filter having a pore size of 1.2 μm (HDCII filter; manufactured by Pall Corporation) under pressure. Thus, each ink was prepared. It should be noted that Table 5-1 to 5-3 shows a value for the dielectric constant of each water-soluble organic solvent measured with an LCR Meter 4284A (manufactured by Hewlett-Packard Japan, Ltd.) under the conditions of a temperature of 20° C. and a measuring frequency of 1 MHz in parentheses. The polyethylene glycol in Table 5-1 to 5-3 has an average molecular weight of 200. An Acetylenol E100 (manufactured by Kawaken Fine Chemicals Co., Ltd.) is an ethylene oxide adduct of acetylene glycol, and is a nonionic surfactant. An HS500 (manufactured by HAYASHIBARA SHOJI, INC.) is one of the saccharides. A BYK348 (manufactured by BYK-Chemie) is a polydimethylsiloxane compound, and is a silicone-based surfactant.

TABLE 5-1

Compositions of inks

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Kind of pigment dispersion | 1 | 1 | 1 | 1 | 1 | 1 | 1 | 1 | 6 | 1 | 1 | 1 | 1 | 1 |
| Kind of resin fine particles | P1 | P2 | P3 | P4 | P5 | P6 | P1 | P1 | P1 | P1 | P1 | P1 | P1 | P1 |
| Pigment dispersion | 20.0 | 20.0 | 20.0 | 20.0 | 20.0 | 20.0 | 20.0 | 20.0 | 20.0 | 20.0 | 20.0 | 20.0 | 20.0 | 20.0 |
| Water dispersion liquid of resin fine particles | 4.0 | 4.0 | 4.0 | 4.0 | 4.0 | 4.0 | 4.0 | 4.0 | 4.0 | 4.0 | 4.0 | 4.0 | 4.0 | 1.1 |
| Glycerin (43.0) | 10.0 | 10.0 | 10.0 | 10.0 | 10.0 | 10.0 | 10.0 | 10.0 | 10.0 | 10.0 | 10.0 | 10.0 | 10.0 | 10.0 |
| 1,4-Butanediol (31.5) | | | | | | | | | | | | | | |
| 1,2,6-Hexanetriol (28.5) | | | | | | | | 5.0 | | | | | | |
| 2-Pyrrolidone (27.5) | 5.0 | 5.0 | 5.0 | 5.0 | 5.0 | 5.0 | | | 5.0 | 12.0 | 10.0 | 1.0 | 0.8 | 2.5 |
| Polyethylene glycol (19.5) | | | | | | | 5.0 | | | | | | | |
| 1,2-Hexanediol (15.3) | | | | | | | | | | | | | | |
| Aqueous solution of urethane resin U1 | 3.0 | 3.0 | 3.0 | 3.0 | 3.0 | 3.0 | 3.0 | 3.0 | 3.0 | 3.0 | 3.0 | 3.0 | 3.0 | 3.0 |
| Aqueous solution of urethane resin U2 | | | | | | | | | | | | | | |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 |
| HS 500 | | | | | | | | | | | | | | |
| Triethanolamine | | | | | | | | | | | | | | |
| BYK 348 | | | | | | | | | | | | | | |
| Ion-exchanged water | 57.5 | 57.5 | 57.5 | 57.5 | 57.5 | 57.5 | 57.5 | 57.5 | 57.5 | 50.5 | 52.5 | 61.5 | 61.7 | 62.9 |
| Content A of resin fine particles [%] | 1.0 | 1.0 | 1.0 | 1.0 | 1.0 | 1.0 | 1.0 | 1.0 | 1.0 | 1.0 | 1.0 | 1.0 | 1.0 | 0.28 |
| Content B of water-soluble organic solvent having dielectric constant of 18.0 or more and less than 30.0 [%] | 5.0 | 5.0 | 5.0 | 5.0 | 5.0 | 5.0 | 5.0 | 5.0 | 5.0 | 12.0 | 10.0 | 1.0 | 0.8 | 2.5 |
| A/B (time(s)) | 0.20 | 0.20 | 0.20 | 0.20 | 0.20 | 0.20 | 0.20 | 0.20 | 0.20 | 0.08 | 0.10 | 1.00 | 1.25 | 0.11 |
| Content C of resin dispersant [%] | 0.6 | 0.6 | 0.6 | 0.6 | 0.6 | 0.6 | 0.6 | 0.6 | 0.6 | 0.6 | 0.6 | 0.6 | 0.6 | 0.6 |
| Content D of carbon black [%] | 3.0 | 3.0 | 3.0 | 3.0 | 3.0 | 3.0 | 3.0 | 3.0 | 3.0 | 3.0 | 3.0 | 3.0 | 3.0 | 3.0 |
| C/D (time(s)) | 0.20 | 0.20 | 0.20 | 0.20 | 0.20 | 0.20 | 0.20 | 0.20 | 0.20 | 0.20 | 0.20 | 0.20 | 0.20 | 0.20 |

TABLE 5-1-continued

Compositions of inks

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Content E of urethane resin [%] | 0.75 | 0.75 | 0.75 | 0.75 | 0.75 | 0.75 | 0.75 | 0.75 | 0.75 | 0.75 | 0.75 | 0.75 | 0.75 | 0.75 |
| E/D (time(s)) | 0.25 | 0.25 | 0.25 | 0.25 | 0.25 | 0.25 | 0.25 | 0.25 | 0.25 | 0.25 | 0.25 | 0.25 | 0.25 | 0.25 |

TABLE 5-2

Compositions of inks

| | Example | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Kind of pigment dispersion | 1 | 1 | 1 | 2 | 3 | 4 | 5 | 1 | 1 | 1 | 1 | 1 | 1 | 1 |
| Kind of resin fine particles | P1 | P1 | P1 | P1 | P1 | P1 | P1 | P1 | P1 | P1 | P1 | P1 | P7 | P8 |
| Pigment dispersion | 20.0 | 20.0 | 20.0 | 20.0 | 20.0 | 20.0 | 20.0 | 20.0 | 20.0 | 20.0 | 20.0 | 20.0 | 20.0 | 20.0 |
| Water dispersion liquid of resin fine particles | 1.2 | 20.0 | 21.0 | 4.0 | 4.0 | 4.0 | 4.0 | 4.0 | 4.0 | 4.0 | 4.0 | 4.0 | 4.0 | 4.0 |
| Glycerin (43.0) | 10.0 | 10.0 | 10.0 | 10.0 | 10.0 | 10.0 | 10.0 | 10.0 | 10.0 | 10.0 | 10.0 | 10.0 | 10.0 | 10.0 |
| 1,4-Butanediol (31.5) | | | | | | | | | | | | | | |
| 1,2,6-Hexanetriol (28.5) | | | | | | | | | | | | | | |
| 2-Pyrrolidone (27.5) | 3.0 | 6.0 | 6.0 | 5.0 | 5.0 | 5.0 | 5.0 | 5.0 | 5.0 | 5.0 | 5.0 | 5.0 | 5.0 | 5.0 |
| Polyethylene glycol (19.5) | | | | | | | | | | | | | | |
| 1,2-Hexanediol (15.3) | | | | | | | | | | | | | | |
| Aqueous solution of urethane resin U1 | 3.0 | 3.0 | 3.0 | 3.0 | 3.0 | 3.0 | 3.0 | 1.5 | 1.8 | 3.6 | 4.0 | | 3.0 | 3.0 |
| Aqueous solution of urethane resin U2 | | | | | | | | | | | | 3.0 | | |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 |
| HS 500 | | | | | | | | | | | | | | |
| Triethanolamine | | | | | | | | | | | | | | |
| BYK 348 | | | | | | | | | | | | | | |
| Ion-exchanged water | 62.3 | 40.5 | 39.5 | 57.5 | 57.5 | 57.5 | 57.5 | 59.0 | 58.7 | 56.9 | 56.5 | 57.5 | 57.5 | 57.5 |
| Content A of resin fine particles [%] | 0.30 | 5.0 | 5.3 | 1.0 | 1.0 | 1.0 | 1.0 | 1.0 | 1.0 | 1.0 | 1.0 | 1.0 | 1.0 | 1.0 |
| Content B of water-soluble organic solvent having dielectric constant of 18.0 or more and less than 30.0 [%] | 3.0 | 6.0 | 6.0 | 5.0 | 5.0 | 5.0 | 5.0 | 5.0 | 5.0 | 5.0 | 5.0 | 5.0 | 5.0 | 5.0 |
| A/B (time(s)) | 0.10 | 0.83 | 0.88 | 0.20 | 0.20 | 0.20 | 0.20 | 0.20 | 0.20 | 0.20 | 0.20 | 0.20 | 0.20 | 0.20 |
| Content C of resin dispersant [%] | 0.6 | 0.6 | 0.6 | 0.36 | 0.45 | 0.9 | 1.2 | 0.6 | 0.6 | 0.6 | 0.6 | 0.6 | 0.6 | 0.6 |
| Content D of carbon black [%] | 3.0 | 3.0 | 3.0 | 3.0 | 3.0 | 3.0 | 3.0 | 3.0 | 3.0 | 3.0 | 3.0 | 3.0 | 3.0 | 3.0 |
| C/D (time(s)) | 0.20 | 0.20 | 0.20 | 0.12 | 0.15 | 0.30 | 0.40 | 0.20 | 0.20 | 0.20 | 0.20 | 0.20 | 0.20 | 0.20 |
| Content E of urethane resin [%] | 0.75 | 0.75 | 0.75 | 0.75 | 0.75 | 0.75 | 0.75 | 0.38 | 0.45 | 0.90 | 1.00 | 0.75 | 0.75 | 0.75 |
| E/D (time(s)) | 0.25 | 0.25 | 0.25 | 0.25 | 0.25 | 0.25 | 0.25 | 0.13 | 0.15 | 0.30 | 0.33 | 0.25 | 0.25 | 0.25 |

TABLE 5-3

Compositions of inks

| | Comparative Example | | | | | | |
|---|---|---|---|---|---|---|---|
| | 1 | 2 | 3 | 4 | 5 | 6 | 7 |
| Kind of pigment dispersion | 1 | 1 | 1 | 1 | 1 | 1 | 6 |
| Kind of resin fine particles | P9 | P10 | P1 | P1 | P11 | P12 | P13 |
| Pigment dispersion | 20.0 | 20.0 | 20.0 | 20.0 | 20.0 | 20.0 | 20.0 |
| Water dispersion liquid of resin fine particles | 4.0 | 4.0 | 4.0 | 4.0 | 4.0 | 24.0 | 3.6 |
| Glycerin (43.0) | 10.0 | 10.0 | 10.0 | 10.0 | 10.0 | 17.0 | 10.0 |
| 1,4-Butanediol (31.5) | | | | 5.0 | | | |
| 1,2,6-Hexanetriol(28.5) | | | | | | | |
| 2-Pyrrolidone (27.5) | 5.0 | 5.0 | | | 5.0 | | 5.0 |
| Polyethylene glycol (19.5) | | | | | | | |
| 1,2-Hexanediol (15.3) | | | 5.0 | | | 5.0 | |
| Aqueous solution of urethane resin U1 | 3.0 | 3.0 | 3.0 | 3.0 | 3.0 | | 3.0 |
| Aqueous solution of urethane resin U2 | | | | | | | |
| Acetylenol E100 | 0.5 | 0.5 | 0.5 | 0.5 | 0.5 | | 0.5 |
| HS 500 | | | | | | 4.0 | |

TABLE 5-3-continued

Compositions of inks

| | Comparative Example | | | | | | |
|---|---|---|---|---|---|---|---|
| | 1 | 2 | 3 | 4 | 5 | 6 | 7 |
| Triethanolamine | | | | | | 0.9 | |
| BYK 348 | | | | | | 0.5 | |
| Ion-exchanged water | 57.5 | 57.5 | 57.5 | 57.5 | 57.5 | 28.6 | 57.9 |
| Content A of resin fine particles [%] | 1.0 | 1.0 | 1.0 | 1.0 | 1.0 | 6.0 | 0.90 |
| Content B of water-soluble organic solvent having dielectric constant of 18.0 or more and less than 30.0 [%] | 5.0 | 5.0 | 0.0 | 0.0 | 5.0 | 0.0 | 5.0 |
| A/B (time(s)) | 0.20 | 0.20 | — | — | 0.20 | — | 0.18 |
| Content C of resin dispersant [%] | 0.6 | 0.6 | 0.6 | 0.6 | 0.6 | 0.6 | 1.5 |
| Content D of carbon black [%] | 3.0 | 3.0 | 3.0 | 3.0 | 3.0 | 3.0 | 3.0 |
| C/D (time(s)) | 0.20 | 0.20 | 0.20 | 0.20 | 0.20 | 0.20 | 0.50 |
| Content E of urethane resin [%] | 0.75 | 0.75 | 0.75 | 0.75 | 0.75 | 0.00 | 0.75 |
| E/D (time(s)) | 0.25 | 0.25 | 0.25 | 0.25 | 0.25 | 0.00 | 0.25 |

<Evaluation>

An ink cartridge filled with each of the inks obtained in the foregoing was mounted on the photo black position of an ink jet recording apparatus capable of ejecting ink by the action of thermal energy (trade name: PIXUS Pro9500; manufactured by Canon Inc.). In the recording apparatus, an image recorded under the following conditions is defined as having a recording duty of 100%. Eight ink droplets each having a mass of 3.5 nanograms (ng) are applied at a resolution of 600 dpi×600 dpi to a unit region measuring 1/600 inch by 1/600 inch. Then, a pattern including a solid image measuring 5 cm by 5 cm whose recording duty is 100% was recorded on a Canon Photographic Paper-Gloss Gold (manufactured by Canon Inc.). In the present invention, in the following evaluation criteria, a level B or higher was regarded as being an acceptable level, a level A was regarded as being an excellent level, a level AA was regarded as being a particularly excellent level, and level C was regarded as being unacceptable levels. Table 6 shows the results of the evaluation.

(Evaluation for Black Density)

After the recorded matter obtained in the foregoing had been stored at normal temperature for 24 hours, the solid image was visually observed and evaluated for its black density. Evaluation criteria are as described below.

AA: No white light due to reflection was observed, and the image had a tight black color.

A: White light due to reflection was slightly observed, but the image had a tight black color.

B: White light due to reflection was observed, but the image had an allowable black density.

C: The black density was low.

(Evaluation for Glossiness)

The 20° gloss level of the solid image in the recorded matter obtained in the foregoing was measured with a Micro-hazemeter Plus (manufactured by BYK-Gardner GmbH), and then an evaluation for glossiness was performed. Evaluation criteria are as described below. It should be noted that too low 20° gloss value means low glossiness of the image and too high 20° gloss value means that the image has unallowable glare.

AA: The 20° gloss value was 45 or more and less than 65.

A: The 20° gloss value was 40 or more and less than 45, or 65 or more and less than 70.

B: The 20° gloss value was 35 or more and less than 40, or 70 or more and less than 75.

C: The 20° gloss value was less than 35, or 75 or more.

TABLE 6

Results of evaluations

| | | Black density | Glossiness |
|---|---|---|---|
| Example | 1 | AA | AA |
| | 2 | AA | AA |
| | 3 | AA | AA |
| | 4 | AA | AA |
| | 5 | AA | AA |
| | 6 | A | A |
| | 7 | AA | AA |
| | 8 | AA | AA |
| | 9 | AA | AA |
| | 10 | B | AA |
| | 11 | A | AA |
| | 12 | A | AA |
| | 13 | B | AA |
| | 14 | B | B |
| | 15 | A | A |
| | 16 | A | A |
| | 17 | B | B |
| | 18 | B | B |
| | 19 | A | A |
| | 20 | A | A |
| | 21 | B | B |
| | 22 | A | A |
| | 23 | AA | AA |
| | 24 | AA | AA |
| | 25 | A | A |
| | 26 | A | A |
| | 27 | A | AA |
| | 28 | A | AA |
| Comparative Example | 1 | C | B |
| | 2 | C | B |
| | 3 | C | AA |
| | 4 | C | AA |
| | 5 | C | B |
| | 6 | C | C |
| | 7 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-194535, filed Aug. 31, 2010, which is hereby incorporated by reference herein in its entirety.

What is claimed is:

1. An ink, comprising:
   a carbon black;
   a resin for dispersing the carbon black;
   a resin fine particle; and
   a water-soluble organic solvent,
   wherein:
   the resin fine particle comprises at least a unit derived from an ethylenically unsaturated hydrophobic monomer, and a unit derived from a monomer selected from an ethylenically unsaturated acid monomer and a salt thereof, and a ratio of a unit derived from a saturated alkyl group-containing monomer to the unit derived from the ethylenically unsaturated hydrophobic monomer is 95.0 mass % or more; and
   the water-soluble organic solvent comprises a water-soluble organic solvent having a dielectric constant at 20° C. of 18.0 or more and less than 30.0.

2. An ink according to claim 1, wherein a mass ratio of a content (mass %) of the resin fine particle to a content (mass %) of the water-soluble organic solvent having a dielectric constant at 20° C. of 18.0 or more and less than 30.0 based on a total mass of the ink is 0.10 times or more and 1.0 times or less.

3. An ink according to claim 1, wherein a content (mass %) of the resin fine particle based on a total mass of the ink is 0.30 mass % or more and 5.0 mass % or less.

4. An ink according to claim 1, wherein a mass ratio of a content (mass %) of the resin for dispersing the carbon black to a content (mass %) of the carbon black based on a total mass of the ink is 0.15 times or more and 0.30 times or less.

5. An ink according to claim 1, further comprising a water-soluble urethane resin, wherein a mass ratio of a content (mass %) of the water-soluble urethane resin to a content (mass %) of the carbon black based on a total mass of the ink is 0.15 times or more and 0.30 times or less.

6. An ink according to claim 5, wherein the water-soluble urethane resin has a poly(oxytetramethylene) structure.

7. An ink according to claim 1, wherein the resin fine particle is polymerized by employing a soap-free polymerization method.

8. An ink according to claim 1, wherein the saturated alkyl group-containing monomer comprises a (meth)acrylic ester of a saturated aliphatic primary alcohol having a chain structure.

9. An ink cartridge, comprising an ink and an ink storage portion for storing the ink, wherein the ink comprises the ink according to claim 1.

10. An ink jet recording method, comprising ejecting ink from a recording head according to an ink jet system to record an image on a recording medium, wherein the ink comprises the ink according to claim 1.

11. An ink jet recording method according to claim 10, wherein the recording medium is a glossy paper.

12. An ink according to claim 1, wherein the water-soluble organic solvent having a dielectric constant at 20° C. of 18.0 or more and less than 30.0 is at least one selected from the group consisting of 1,2,6-hexanetriol, 2-pyrrolidone, 1,5-pentanediol, 3-methyl-1,5-pentanediol, and polyethylene glycol having an average molecular weight of 200.

13. An ink according to claim 1, wherein a content (mass %) of the water-soluble organic solvent having a dielectric constant at 20° C. of 18.0 or more and less than 30.0 is 0.5 mass % or more and 10.0 mass % or less based on the total mass of the ink, and a content (mass %) of the water-soluble organic solvent is 3.0 mass % or more and 50.0 mass % or less based on the total mass of the ink.

14. An ink according to claim 1, wherein the resin for dispersing the carbon black is a water-soluble resin that is a copolymer having at least a hydrophilic unit derived from (meth)acrylic acid and a hydrophobic unit derived from an aromatic ring-containing monomer.

15. An ink according to claim 5, wherein the water-soluble urethane resin is a polyether-based urethane resin.

* * * * *